Nov. 19, 1929.   C. H. KNUDSEN   1,736,287
INTERNAL COMBUSTION ENGINE
Original Filed Feb. 19, 1926
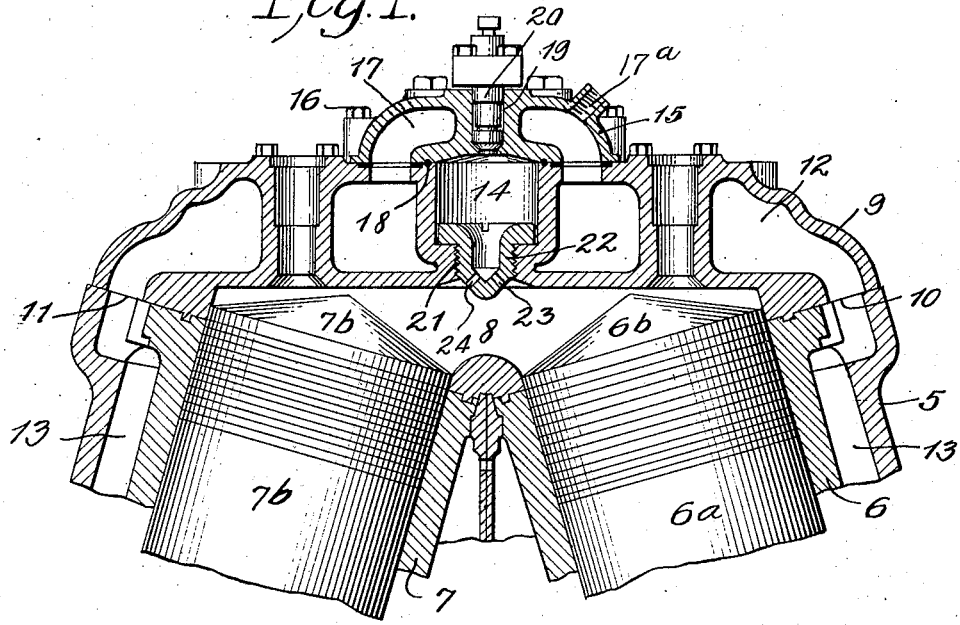
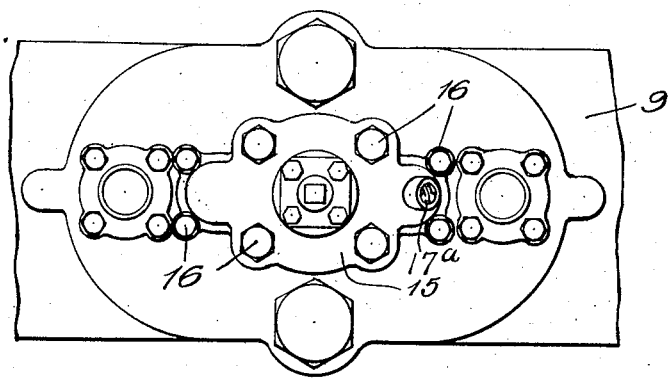
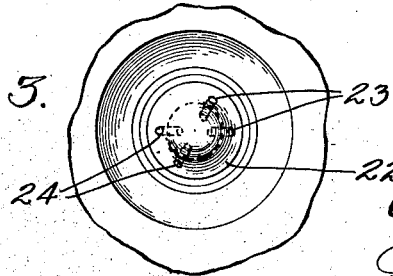
INVENTOR
Carl H. Knudsen
BY
Howard E. Thompson
ATTORNEY Patented Nov. 19, 1929

1,736,287

UNITED STATES PATENT OFFICE

CARL H. KNUDSEN, OF NEW YORK, N. Y.

INTERNAL-COMBUSTION ENGINE

Application filed February 19, 1926, Serial No. 89,321. Renewed February 6, 1929.

This invention relates to internal combustion engines and particularly to the cylinder head construction of engines of this class and especially engines of the inverted V-type having pairs of cylinders converging at the head ends in a common combustion chamber and having one cylinder head within which the combustion chamber of said cylinders is formed; and the object of the invention is to provide a cylinder head of the class specified with an auxiliary combustion or pre-ignition chamber positioned centrally of the main combustion chamber and thereabove whereby fuel oil may be injected directly into the auxiliary or pre-ignition chamber and thus discharged into the combustion chamber in a vaporized and pre-ignited state for the purpose of increasing the power of the engine, and further for the purpose of producing a more complete and perfect combustion of the gases to eliminate a smoky exhaust; a further object being to provide between the auxiliary or pre-ignition chamber and the main combustion chamber, a nozzle for directly the pre-ignited and vaporized fuel into the combustion chamber in spray fashion, and to distribute the same throughout the area of the combustion chamber; a further object being to provide a water jacket completely encircling the auxiliary or pre-ignition chamber whereby the cooling water of the engine may be exposed to said chamber to maintain the desired and required temperature therein, and yet retain at the nozzle discharge the highest degrees of heat, to effect a more perfect vaporization of the fuel in its discharge into the main combustion chamber; and with these and other objects in view, the invention consists in a cylinder head of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a transverse, diagrammatic, sectional view of the upper end portion of an inverted V-type engine showing my improved head mounted in connection therewith.

Fig. 2 is a plan view of the structure shown in Fig. 1 on a reduced scale; and,

Fig. 3 is a detail view of a part of the structure shown in Fig. 1 and indicating the discharge end of the nozzle employed.

In Fig. 1 of the drawing, I have indicated at 5 the upper end portion of an inverted V-type fuel oil engine having cylinders 6 and 7 arranged in pairs and converging at their head ends to form a common combustion chamber 8 within the cylinder head 9 of the pair of cylinders 6—7, and the pistons $6^a$ and $7^a$ in the respective cylinders are conical in form as seen at $6^b$ and $7^b$ at the upper or head ends thereof to form a restricted combustion chamber 8, centrally of the cylinder head 9 as clearly seen in Fig. 1 of the drawing.

The cylinder head 9 is provided with angularly disposed faces 10 and 11, which sit upon the upper ends of the cylinders 6 and 7 as clearly seen in Fig. 1. The head 9 is provided with a water jacket 12 in communication with the water jackets 13 of the cylinders 6 and 7. Centrally of the head 9, and within the water jacket 12 is formed an auxiliary or pre-ignition chamber 14, the walls of said chamber being exposed to the water in the jacket 12. The upper end of said chamber is closed by a cap or cover 15 secured to the head 9 by bolts or screws 16, and in which is formed a water jacket 17 in communication with the jacket 12. The central part of the cap 15 is sealed upon the upper edge of the walls of the chamber 14 as seen at 18 by suitable packing rings or gaskets, thus rendering the chamber sealed, in so far as its exposure to the water jackets is concerned.

Centrally of the cap 15 is a bore 19 in which the fuel injecting nozzle 20 is mounted, said nozzle being supported upon the cap as will be apparent. The nozzle 20 is preferably of the solid fuel injecting type, but may be of any preferred form and construction.

The bottom of the chamber 14 has a threaded bore 21 opening into the combustion chamber 8, and a nozzle 22 is threaded into the bore 21, the lower end of which is conical in form and opens into the combustion chamber 8, and is provided at oppositely disposed points with two sets of discharge apertures 23 and 24 for directing fuel into the combustion chamber 8, preferably in the direction of the pistons 6ª—7ª in the respective cylinders 6 and 7. It will be understood that any number of the apertures 24 may be employed, and the specific arrangement thereof may be such as to suit the characteristics of the combustion chamber employed.

In the use of my improved cylinder head construction, it will be apparent that on the compression stroke of the pistons, air under pressure is forced into the auxiliary or pre-ignition chamber 14; and in the charge of fuel oil into said chamber, the same is pre-ignited and vaporized prior to its discharge into the combustion chamber in the operation of firing or explosion of the mixture, and by directing the pre-ignited and vaporized fuel and air through the restricted orifices or apertures in the nozzle 22 which will be the hottest part of the chamber 14, will operate to increase the vaporization and to produce a perfect combustion of the gases, eliminating the collection of unburnt fuel or gases upon the wall of the combustion chamber and the several surfaces exposed thereto, which cause or produce a smoky exhaust, and thereby eliminating such smoky exhaust. In addition to this accomplishment, a greater engine power is produced, or in other words, better efficiency effected and still further, in the accomplishment of these results by reducing the pressure of the compressed air in the combustion chamber, by adding thereto the auxiliary or pre-ignition chamber, efficiency is also provided in the motor operation, thus reducing the stresses and strains on the several parts of the engine structure as will be apparent.

In addition to the foregoing features, it is also to be noted that by providing a substantially complete water jacket for the entire chamber 14, the overheating of the walls of the chamber is eliminated, and the greatest amount of heat is maintained in the conical head of the nozzle 22, producing the most desirable and effective results.

It will be understood that while I have shown my invention as applied to an engine of specific type, and have shown a particular head construction, that I am not necessarily limited in these respects, and various other changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. A cylinder head having angularly disposed faces adapted to seat upon cylinders converging at their head ends, a combustion chamber in said head, an auxiliary chamber in said head and in communication with said combustion chamber, a nozzle controlling the communication between the auxiliary chamber and combustion chamber, said nozzle being detachable with respect to the head and provided with pairs of oppositely disposed discharged apertures, said combustion chamber and auxiliary chamber being water-jacketed, a cap detachably mounted on the head and having a portion forming a closure for the upper end of the auxiliary chamber and a fuel injecting nozzle mounted in said cap and adapted to direct fuel into said auxiliary chamber, and said cap having a water jacket exposed to the water jacket of the cylinder head.

2. In an engine of the class described, having pairs of cylinders converging at their head ends and a cylinder head forming between the head ends of the pistons and within said cylinder head a combustion chamber, an auxiliary chamber formed centrally of the head, a nozzle for placing the auxiliary chamber in communication with said combustion chamber intermediate said pistons, a cap detachably mounted on the head and forming a closure for said auxiliary chamber, a fuel injecting nozzle mounted in said cap and communicating with said auxiliary chamber, and the lower end of said first named nozzle being conical in form and provided on opposite side faces with discharge apertures directed laterally into the combustion chamber in the direction of said converging cylinders.

3. In an engine of the class described, having pairs of cylinders converging at their head ends and a cylinder head forming between the head ends of the pistons and within said cylinder head a combustion chamber, an auxiliary chamber formed centrally of the head, a nozzle for placing the auxiliary chamber in communication with said combustion chamber intermediate said pistons, a cap detachably mounted on the head and forming a closure for said auxiliary chamber, a feul injecting nozzle mounted in said cap and communicating with said auxiliary chamber, the lower end of said first named nozzle being conical in form and provided on opposite side faces with discharge apertures directed laterally into the combustion chamber in the direction of said converging cylinders, and said cylinder head and cap being water jacketed to substantially encircle said auxiliary chamber by the cooling water of the engine.

In testimony that I claim the foregoing as my invention I have signed my name this 16th day of Feb., 1926.

CARL H. KNUDSEN.